United States Patent
Viswanathan

(10) Patent No.: US 9,384,159 B2
(45) Date of Patent: Jul. 5, 2016

(54) CREATING A CHECKPOINT FOR A SOFTWARE PARTITION IN AN ASYNCHRONOUS INPUT/OUTPUT ENVIRONMENT

(75) Inventor: Srikant Viswanathan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1773 days.

(21) Appl. No.: 11/753,360

(22) Filed: May 24, 2007

(65) Prior Publication Data

US 2008/0294823 A1    Nov. 27, 2008

(51) Int. Cl.
G06F 13/38    (2006.01)

(52) U.S. Cl.
CPC .................................. *G06F 13/387* (2013.01)

(58) Field of Classification Search
USPC ....................................................... 710/7, 112
See application file for complete search history.

(56) References Cited

U.S. PATENT DOCUMENTS

| | | | |
|---|---|---|---|
| 5,297,274 A | 3/1994 | Jackson | |
| 5,301,331 A * | 4/1994 | Ueno et al. | 710/260 |
| 5,706,489 A | 1/1998 | Chi et al. | |
| 5,748,882 A | 5/1998 | Huang | |
| 5,875,343 A * | 2/1999 | Binford et al. | 710/263 |
| 6,157,991 A * | 12/2000 | Arnon | 711/161 |
| 6,898,785 B2 | 5/2005 | Ramasamy et al. | |
| 7,047,521 B2 | 5/2006 | Bunnell | |
| 7,568,009 B2 | 7/2009 | Kirstein | |
| 7,725,763 B2 | 5/2010 | Vertes et al. | |
| 7,913,257 B2 | 3/2011 | Nishikawa | |
| 2002/0199172 A1 | 12/2002 | Bunnell | |
| 2005/0251785 A1 | 11/2005 | Vertes et al. | |
| 2006/0123420 A1 * | 6/2006 | Nishikawa | 718/104 |
| 2006/0149865 A1 * | 7/2006 | Kirstein | 710/52 |
| 2008/0244553 A1 * | 10/2008 | Cromer et al. | 717/168 |
| 2008/0307265 A1 | 12/2008 | Vertes | |

FOREIGN PATENT DOCUMENTS

| | | |
|---|---|---|
| FR | 2843209 A1 | 2/2004 |
| FR | 2872605 A1 | 4/2006 |

(Continued)

OTHER PUBLICATIONS

Ferrari et al., "Process Introspection: A Heterogeneous Chexkpoint/Restart Mechanism Based on Automatic Code Modification," http://reference.kfupm.edu.sa/content/p/r/process_introspection_a_heterogeneous_c_476925, Mar. 1997, 16 pages.

(Continued)

*Primary Examiner* — Henry Tsai
*Assistant Examiner* — John Roche
(74) *Attorney, Agent, or Firm* — Yee & Associates, P.C.; Steven Bennett

(57) ABSTRACT

A computer implemented method, apparatus, and computer program product for creating a checkpoint for a software partition. A checkpoint request is received for creating the checkpoint for the software partition. Each process in a set of processes in the software partition is frozen to form a set of frozen processes. In an asynchronous input/output queue, the status of each input/output request sent by the set of frozen processes is set to "suspended" to form a set of suspended requests, wherein the set of suspended requests are not performed. The set of suspended requests are stored in the checkpoint to form stored requests.

17 Claims, 5 Drawing Sheets

(56) References Cited

FOREIGN PATENT DOCUMENTS

WO     WO 2005050404 A2 *   6/2005
WO     2006010812 A2    2/2006

OTHER PUBLICATIONS

Ferrari et al., "Heterogeneous Process State Capture and Recovery Through Process Introspection," Cluster Computing, 3:63-73, Sep. 2000.

International Search Report dated Jan. 10, 2007, regarding Application No. PCT/FR2005/001564, 3 pages.

Landau, "The Checkpoint Mechanism in KeyKOS," Proceedings of the Second International Workshop on Object Orientation in Operating Systems, Sep. 1992, 9 pages.

Padala, "Playing with ptrace, Part I," Linux Journal, Nov. 1, 2002, 7 pages.

Zandy et al., "Process Hijacking," HPDC '99 Proceedings of the 8th IEEE International Symposium on High Performance Distributed Computing, Redondo Beach, CA, Aug. 3-6, 1999, pp. 177-184. (Abstract only).

Zhong et al., "CRAK: Linux Checkpoint/Restart as a Kernel Module," Technical Report CUCS-014-01, Columbia University, Nov. 2001, 18 pages.

USPTO Office Action dated Jun. 9, 2009, regarding U.S. Appl. No. 11/813,908, 15 pages.

USPTO Final Office Action dated Dec. 30, 2009, regarding U.S. Appl. No. 11/813,908, 9 pages.

* cited by examiner

CREATING A CHECKPOINT FOR A SOFTWARE PARTITION IN AN ASYNCHRONOUS INPUT/OUTPUT ENVIRONMENT

BACKGROUND OF THE INVENTION

1. Field of the Invention

The present invention relates generally to data processing systems and in particular to software processes. Still more particularly, the present invention relates to a computer implemented method, apparatus, and computer program code for creating a checkpoint of a software partition in an asynchronous input/output (AIO) environment.

2. Description of the Related Art

A single instance of an operating system may be partitioned into one or more virtual operating system environments. Each virtual operating system environment creates a software partition. A software partition includes a set of processes and a set of states associated with the set of processes. Thus, a software partition is a virtual operating system environment within a single instance of an operating system.

When a server in a network runs one or more software processes, it is often desirable to create a software partition for the software processes, and move the software partition having the software processes from one server to another server. The server where the software partition initially resides is called the departure sever, and the server receiving the software partition is called the arrival server. For example, moving a software partition from the departure sever to the arrival server allows the departure server to be shut down for maintenance while the software processes continue to run on the arrival server.

Moving a software partition involves creating a checkpoint. The information gathered in creating the checkpoint is called checkpoint data. The terms checkpoint and checkpoint data are used interchangeably. The checkpoint data contains information about the software partition, including the state of every process in the software partition on the departure server prior to the move. The checkpoint data may be contained in one or more files. After the software partition is moved to the arrival server, the checkpoint data is used to restore the state of every process in the software partition on the arrival server. The checkpoint data is created by freezing each process in the software partition, and gathering state information for each process while the process is frozen. A process is frozen by temporarily stopping the execution of the process. Freezing each process prior to saving the state of the process ensures that the state of each process is not modified when the process state is saved.

However, if the software partition uses asynchronous input/output, the checkpoint data may not be accurate, because each process in the set of processes may request an asynchronous input/output before the process is frozen. Any asynchronous input/output requests requested before a process is frozen continue in the background after the process is frozen. The input/output requests in the background may modify the state of the process even after the process is frozen, making it difficult to obtain accurate checkpoint data for the software partition.

SUMMARY OF THE INVENTION

The illustrative embodiments described herein provide a computer implemented method, apparatus, and computer program product for creating a checkpoint for a software partition. A checkpoint request is received for creating the checkpoint for the software partition. Each process in a set of processes in the software partition is frozen to form a set of frozen processes. In an asynchronous input/output queue, the status of each input/output request sent by the set of frozen processes is set to "suspended" to form a set of suspended requests, wherein the set of suspended requests is not performed. The set of suspended requests is stored in the checkpoint to form stored requests.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
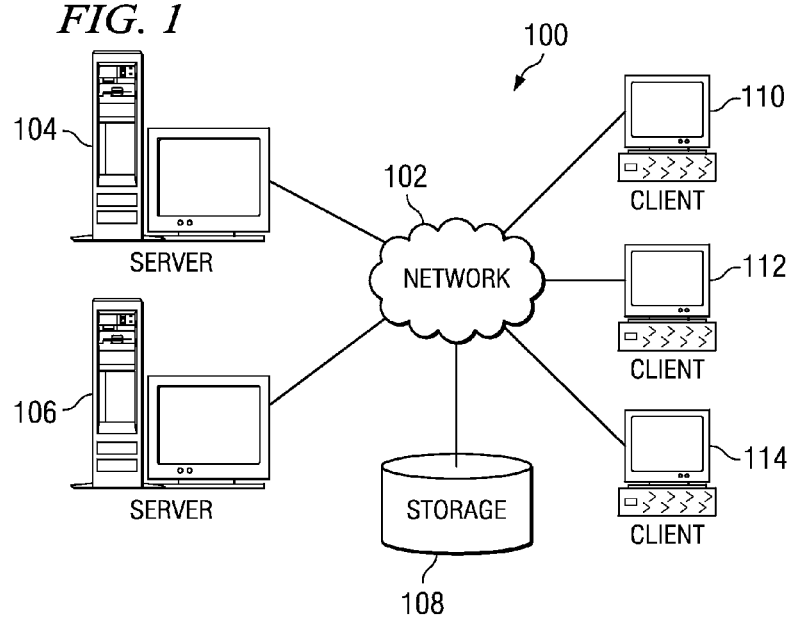
FIG. 1 depicts a pictorial representation of a network of data processing systems in accordance with an illustrative embodiment.
Figure 2:
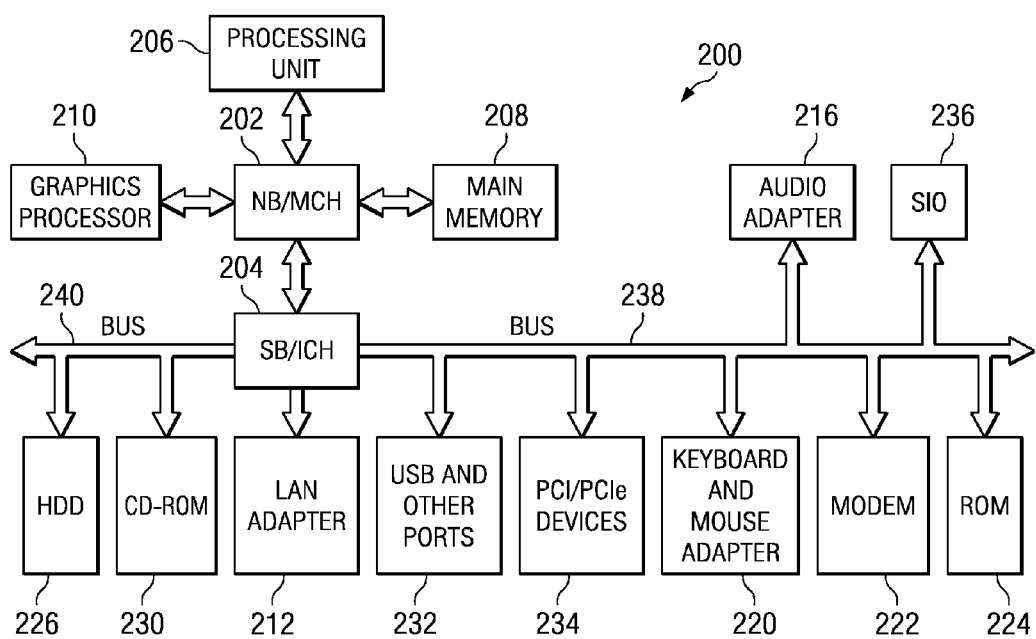
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A software partition includes a set of processes and a set of states associated with the set of processes. A set comprises one or more elements, so that the set of processes contains one or more processes, and the set of states contains one or more states. When a server, such as server 104, runs one or more software processes, it is desirable to create a software partition for the software processes, and move the software partition having the processes from one server to another server. The server where the software partition is taken from is called the departure server, and the server receiving the software partition is called the arrival server.

Moving a software partition involves creating a checkpoint containing the state of every process in the software partition. The checkpoint is created by freezing all processes in the software partition, and gathering state information for each process while the processes are frozen. A process is frozen by temporarily stopping the execution of the process. Freezing each process prior to creating the checkpoint ensures that the state of each process is not modified when the checkpoint is created. Thus, moving the software partition involves freezing the processes on the departure server, creating a checkpoint, moving the software partition to the arrival server, and restarting the frozen processes on the arrival server. Restarting a frozen process involves restoring the state of the process using the checkpoint data. Restarting a frozen process is also known as unfreezing the process.

Figure 3:
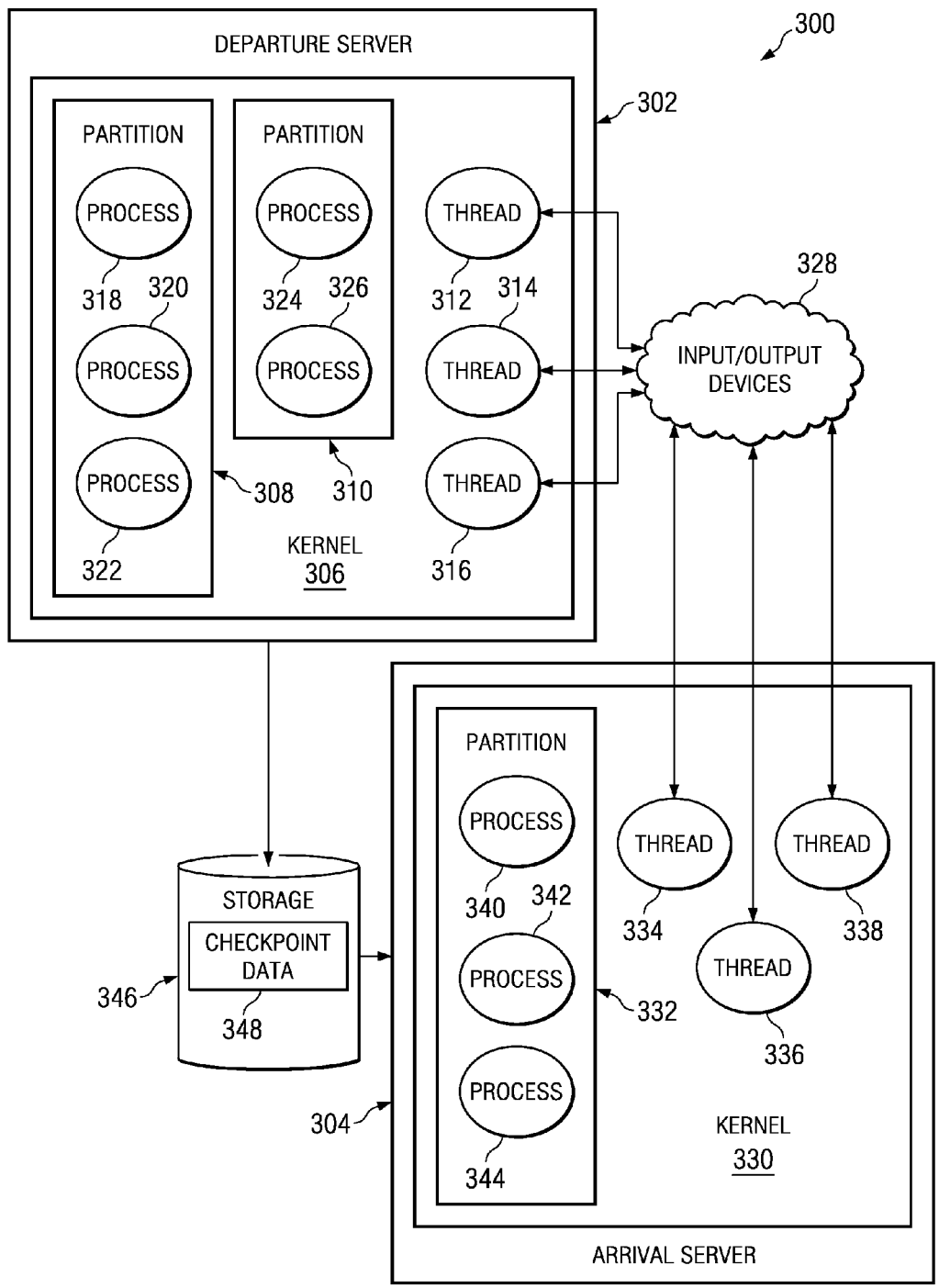
FIG. 3 is a block diagram of software and hardware components in accordance with an illustrative embodiment.

FIG. 3 is a block diagram of a data processing system in accordance with an illustrative embodiment. Data processing system 300 is a data processing system, such as, without limitation, data processing system 100 in FIG. 1. Data processing system 300 contains departure server 302, and arrival server 304. Departure server 302 and arrival server 304 may be implemented in any type of server, such as server 104 in FIG. 1. Departure server 302 runs software, including kernel 306. In these examples, kernel 306, is a central component of the operating system for a server. The responsibilities of the kernel include managing the server's resources, and the communication between the various hardware and software components of the server.

In this particular example, kernel 306 manages the resources of departure server 306, such as input/output (I/O) resources, and memory. For example, kernel 306 may manage input/output resources such as graphics processor 210, audio adapter 216, keyboard and mouse adapter 220, modem 222, universal serial bus (USB) and other ports 232, and PCI/PCIe devices 234 in FIG. 2. An input/output resource such keyboard and mouse adapter 220 may be used to accept input from a user via a keyboard and mouse attached to departure server 302. An input/output resource such as graphics processor 210 may be used to display output from departure server 302 to a user. An input/output resource such as universal serial bus (USB) and other ports 232 may be used to communicate with devices attached to departure server 302, such as printers, and scanners. In addition, universal serial bus (USB) and other ports 232 may be used to communicate with other servers, such as arrival server 304.

Kernel 306 contains partition 308, partition 310, and threads 312, 314, and 316. Partition 308 and 310 are software partitions. In AIX®, a software partition is known as a workload partition™. AIX® (Advanced Interactive executive) is a proprietary, Unix-based operating system developed by International Business Machines (IBM®). Each software partition contains a set of processes, typically processes considered important to the operation of the partition. A set of processes is one or more processes.

In this example, partition 308 contains three processes, processes 318, 320, and 322, and partition 310 contains two processes, processes 324, and 326. Kernel 306 contains three threads for performing asynchronous input/output, threads 312-316. Three processes are shown in partition 308, and three threads are shown in kernel 306 purely for the purpose of illustration. Those versed in the art will appreciate that an actual implementation may contain a different number of processes in each partition, and a different number of threads in each kernel.

Threads 312-316 in kernel 306 perform input/output requests submitted by software processes 318-326 in partitions 308-310. Threads 312-316 in kernel 306 perform input/output requests using input/output devices 328. Input/output devices 328 are a set of one or more devices such as disk drives, optical storage drives, network connectors, and ports. The devices in input/output devices 328 may be located within departure server 302, external to departure server 302, or may be a combination of devices located both within and external to departure server 302.

Arrival server 304 contains kernel 330. Kernel 330 contains partition 332, and threads 334, 336, and 338. Partition 332 contains three processes, process 340, 342, and 344. Threads 334-338 in kernel 330 perform input/output requests submitted by processes 340-344 using input/output devices 328.

Assume that departure server 302 must be shut down to perform hardware maintenance, and partition 308 runs software, such as process 318, which cannot be shutdown for more than a brief period of time. In order to allow the software to continue to run during the maintenance of departure server 302, partition 308 is moved to arrival server 304 prior to the maintenance. Prior to moving partition 308 from departure server 302 to arrival server 304, processes 318-322 are frozen, and a checkpoint is created.

Creating a checkpoint involves gathering and storing a snapshot of the state of each process in partition 308 in the checkpoint data. This checkpoint data includes any other information needed to run a process on another partition or data processing system. The checkpoint data for the checkpoint is stored on storage 346 as checkpoint data 348. Checkpoint data 348 is a set of one or more files containing the data used to move a partition from departure server 302 to arrival server 304. Once checkpoint data 348 is taken and stored, departure server 302 is shutdown and maintenance is performed. Partition 308 is moved to arrival server 304. Processes 318-322 are restarted on arrival server, and checkpoint data 348 is used to restore the state of processes 318-322.

Figure 4:
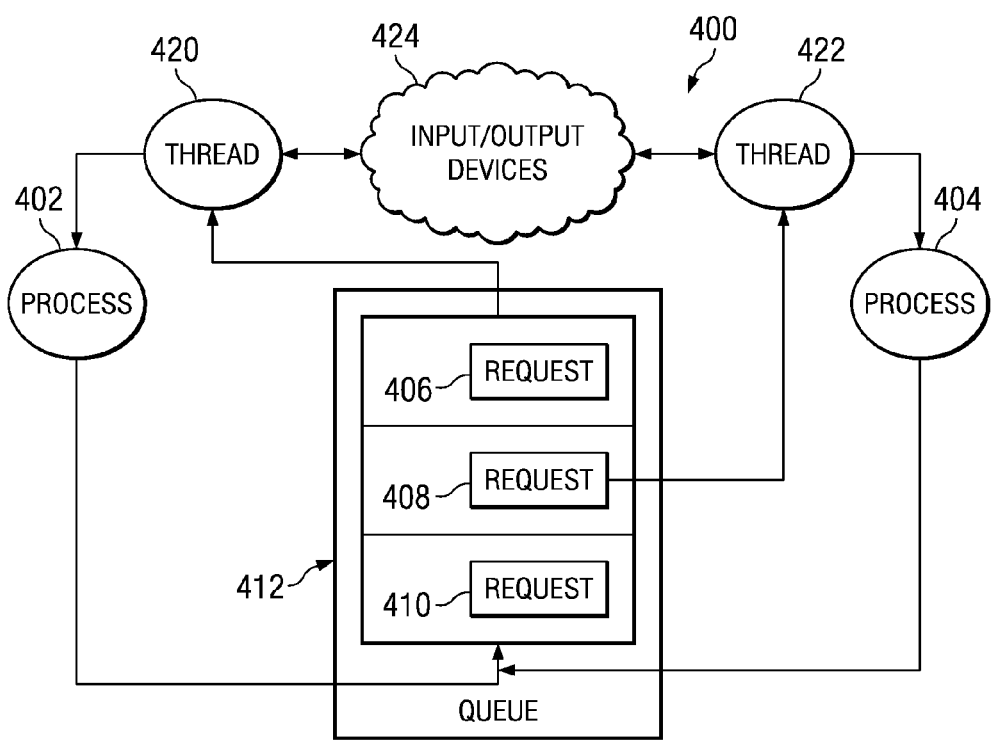
FIG. 4 is a block diagram of an asynchronous input/output request queue in accordance with an illustrative embodiment.

FIG. 4 is a block diagram of an asynchronous input/output request queue in accordance with an illustrative embodiment. Asynchronous input/output request queue 400 is an example of a conventional input/output request queue used in many UNIX®-based operating systems, such as AIX®. In this example, process 402 and process 404 are processes, such as processes 324-326 in FIG. 3. Processes 402 and 404 generate asynchronous input/output requests 406, 408, and 410. When an asynchronous input/output request is generated, the asynchronous input/output request is placed at the bottom of queue 412. In this example, queue 412 contains requests 406-410, with request 406 at the top of queue 412, request 408 in the middle of queue 412, and request 410 at the bottom of queue 412.

Thread 420 is a thread, such as thread 312 in FIG. 3. Thread 420 takes an asynchronous input/output request, such as request 406, from the top of queue 412, and sends the request to input/output devices 424. Input/output devices 424 send the result of performing the input/output request back to thread 420. Thread 420 sends the result of performing request 406 back to process 402.

While thread 420 is processing request 406, thread 422 takes the next input/output request, request 408, from the top of queue 412, and sends request 408 to input/output devices 424. Input devices 424 sends the result of performing the request 408 back to thread 422, and thread 422 sends the result of performing the input/output request back to process 404. Similarly, while thread 422 is processing input/output request 408, thread 420 takes and processes request 410 from queue 412. After a process submits an input/output request, the process is free to work on other tasks while the request is queued and later is performed.

In this example, only one queue, two threads, and two processes are shown for the sake of clarity. Those versed in the art will appreciate that in a typical application, multiple threads are used to read multiple queues containing requests generated by multiple processes.

In this example, assume that process 402 is on a departure server, such as departure server 302. Assume also that process 402 submits an asynchronous input/output request, request 406, before process 402 is frozen. In addition, assume that request 406 is performed by thread 420 during the time process 402 is frozen, and moved to an arrival server, such as arrival server 304 in FIG. 3. When process 402 is restarted on the arrival server, process 402 is not synchronized with the status of asynchronous input/output request 406. Specifically, process 402 expects to receive the result of asynchronous input/output request 406, but thread 420 has already performed asynchronous input/output request 406.

Therefore, the illustrative embodiments recognize that an asynchronous input/output state of a process cannot be captured by simply freezing the process, because any asynchronous input/output requests submitted by the process continue to execute in the background when the process is frozen. If a process submits an asynchronous input/output (AIO) request before the process is frozen; the process state may be modified after the process is frozen. The asynchronous input/output request is queued up as an input/output request in the kernel of the operating system, and the actual input/output request is performed in the background by a separate set of operating system threads. The result of the input/output request may modify the state of the process while a checkpoint is created, because the operating system threads are running even when the process is frozen. If the state of the process is modified while the checkpoint is created, then serious problems result when the software partition is started on the arrival server, because the process state and checkpoint data do not match. Without an accurate checkpoint, restoring the software partition on the arrival server is difficult because the checkpoint data and process state may be inconsistent.

Thus, the illustrative embodiments recognize that an accurate checkpoint, which takes into account asynchronous input/output requests, is required to successfully move a software partition from one server to another server. Also, the illustrative embodiments recognize that an asynchronous input/output request can potentially take a long time to complete, so creating the checkpoint may not be postponed until all asynchronous input/output requests are completed. In addition, the illustrative embodiments recognize that, typically, the greater the number of asynchronous input/output requests submitted by a process, the greater the amount of checkpoint data which needs to be collected and stored for that process. Thus, the illustrative embodiments recognize that when creating a checkpoint for a software partition there is a need for creating checkpoint data that includes the state of asynchronous input/output (AIO) requests submitted by the software processes in the software partition.

Therefore, the illustrative embodiments described herein provide a computer implemented method, apparatus, and computer program product for creating a checkpoint for a software partition. A checkpoint request is received for creating the checkpoint for the software partition. Each process in a set of processes in the software partition is frozen to form a set of frozen processes. In an asynchronous input/output queue, the status of each input/output request sent by the set of frozen processes is set to "suspended" to form a set of suspended requests, wherein the set of suspended requests is not performed. The set of suspended requests is stored in the checkpoint to form stored requests.

Figure 5:
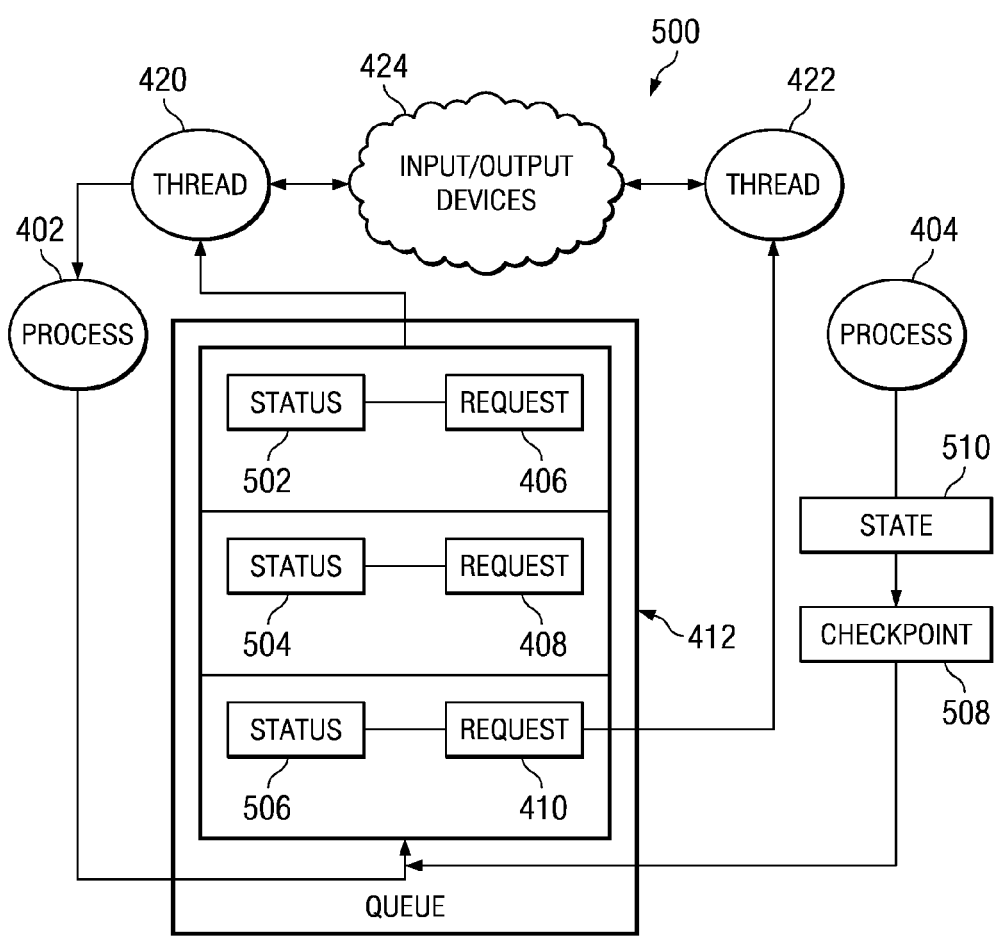
FIG. 5 is a block diagram of an asynchronous input/output request queue with status field in accordance with an illustrative embodiment.

FIG. 5 is a block diagram of an asynchronous input/output request queue with status field in accordance with an illustrative embodiment. In asynchronous input/output request queue with status field 500, process 404 is frozen in order to create a checkpoint. Queue 412 has three input/output requests, requests 406-410.

A status field is added to each request in the queue. The status field identifies the status of each asynchronous input/output request in queue 412. The status field contains one of three possible values, "queued", "executing", and "suspended". When the status field of an input/output request has the value "queued", the status field identifies the input/output request as queued in asynchronous input/output queue 412. When the status field of an input/output request has the value "executing", the status field identifies the input/output request as being performed by a thread servicing the input/output queue. When the status field of an input/output request has the value "suspended", the status field identifies that a thread servicing the input/output queue should not perform the input/output request, and identifies that the input/output request should be left in the queue.

In queue 412, status 502 is added to request 406, status 504 is added to request 408, and status 506 is added to request 410. As each request is added to queue 412, the status field of each request is initially set to "queued". In this example, when request 406 is added to queue 412, status 502 is set to "queued". Similarly, when request 408 is added to queue 412, status 504 is set to "queued", and when request 410 is added to queue 412, status 506 is set to "queued".

When a thread takes a request from the top of queue 412, the status of the request is changed from "queued" to "executing". For example, if thread 420 takes request 406 from the top of queue 412, thread 420 changes status 502 from "queued" to "executing", identifying that thread 420 is performing request 406.

To create a checkpoint, all the queued requests issued by frozen processes are marked "suspended". The threads performing the input/output requests do not perform any input/output requests marked "suspended", ensuring that the process state, as well as the asynchronous input/output state, does not change during the time the checkpoint is created.

In this example, checkpoint data 508 is created for process 404. Assume that process 404 generated request 408, while process 402 generated requests 406 and 410. To create checkpoint data 508 for process 404, process 404 is frozen, and request 408 is marked "suspended" because process 404 issued request 408. The state associated with process 404, state 510, is captured and stored in checkpoint data 508.

In addition to storing state 510 of process 404 in checkpoint 508, all the asynchronous input/output requests in queue 412 marked "suspended" are copied and stored in checkpoint data 508. In this example, request 408 is copied from queue 412 and stored in checkpoint data 508. Once the checkpoint is complete, the software partition is moved from the departure server, such as departure server 302 in FIG. 3, to the arrival server, such as arrival server 304.

The asynchronous input/output requests from the departure server are placed in the corresponding queue in the arrival server, and the asynchronous input/output requests from the departure server are marked "queued". In this example, request 408 is placed in a queue on the arrival server. The state, such as state 510, of each frozen process in the software partition is restored in the arrival server using checkpoint data 508. The software partition is restarted by unfreezing the frozen processes. Unfreezing a previously frozen process results in the process executing software code.

After the software partition is successfully up and running on the arrival server, each process in the software partition on the departure server may be killed, or left to continue to run. A process is killed by sending a message to the process to terminate execution. When a process is asked to terminate execution, the process stops executing software code, and releases any resources, such as memory, the process was using. In this example, once process 404 is restored on the arrival server, process 404 may be killed or left to continue to run on the departure server.

If a decision is made to allow process 404 to continue on the departure server, all asynchronous input/output requests submitted by process 404, and marked "suspended" are changed to "queued" so that the requests on the departure server can be processed. It may be desirable to have process 404 run on both the departure server, and the arrival server, in order to increase the output of process 404. If a decision is made to kill process 404 on the departure server, then all asynchronous input/output requests submitted by process 404 are deleted from the input/output queue. In this example, if process 404 is killed on the departure server, then request 408 is deleted from queue 412.

There are situations in which an input/output request in the queues cannot be set to "suspended". One situation in which an input/output request in the queues cannot be set to "suspended" occurs when the status of the input/output request is set to "executing", because a thread has started performing the input/output request. If the status of an input/output request is "executing" when creating a checkpoint, then the asynchronous input/output request is allowed to complete before the checkpoint is created. While the asynchronous input/output request is completed, all pending input/output requests in the input/output request queue are marked "suspended".

Another situation in which an asynchronous input/output request in the queues cannot be marked "suspended" occurs when a process submits a special type of asynchronous input/output request. The special types of asynchronous input/output requests may vary based on the operating system. For example, in AIX™, a process may submit a set of multiple input/output requests, and the process may ask for the set of multiple input/output requests to be treated as a single asynchronous input/output request.

Thus, in AIX®, treating a set of multiple input/output requests as a single asynchronous input/output request is a special type of asynchronous input/output request. In the set of multiple input/output requests, the status of some input/output requests may be "queued", while the status of other input/output requests may be "executing". The requests in the queue marked "queued" cannot be marked "suspended" because the entire set of multiple input/output requests is treated as a single input/output request. Therefore, the system waits for each request in the set of multiple input/output requests to complete before performing the checkpoint.

In the situations described above, at least one input/output request in the asynchronous input/output queue cannot be marked "suspended" when creating a checkpoint. In such situations, the checkpoint data for the process issuing the at least one asynchronous input/output request is gathered after the at least asynchronous one input/output request is performed.

Figure 6:
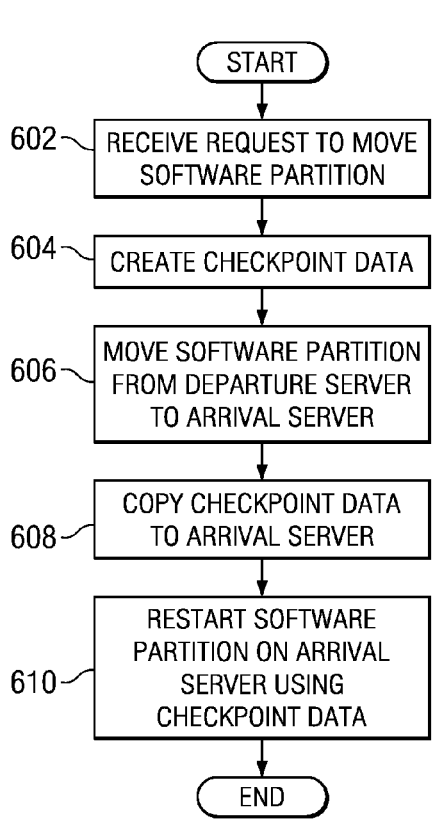
FIG. 6 is a flowchart for transferring a software partition in accordance with an illustrative embodiment.

FIG. 6 is a flowchart for transferring a software partition in accordance with an illustrative embodiment. The steps in FIG. 6 are performed by a thread in a kernel, such as thread 312 in FIG. 3.

Transferring the software partition begins with the thread receiving a request to move a software partition (step 602). Checkpoint data is created for the software partition (step 604). The software partition is moved from a departure server to an arrival server (step 606). The checkpoint data is copied to the arrival server (step 608). The software partition is restarted on the arrival server using the checkpoint data (step 610), and the thread ends transferring the software partition.

Figure 7:
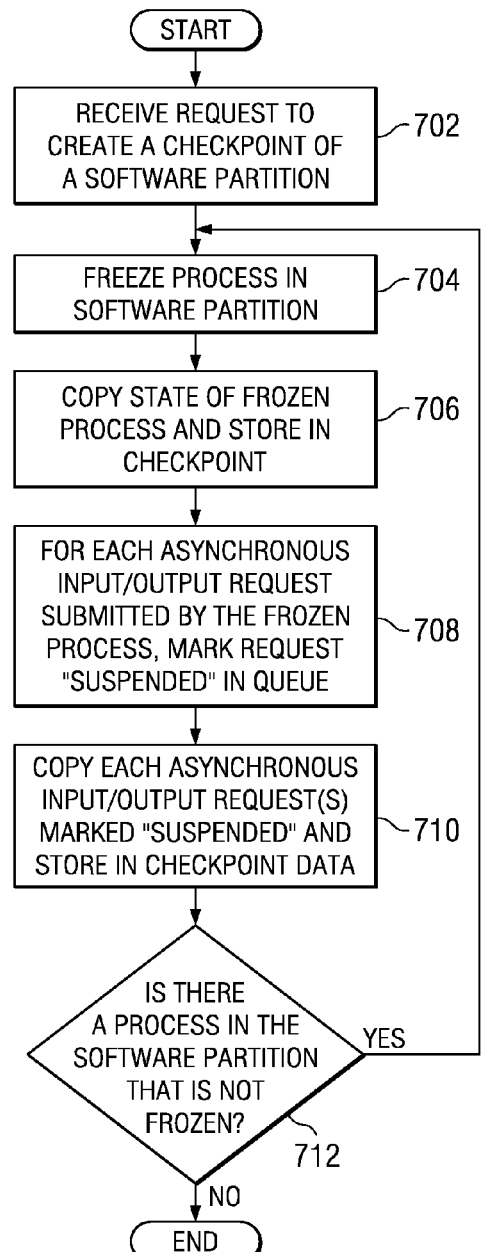
FIG. 7 is a flowchart for creating a checkpoint in accordance with an illustrative embodiment.

FIG. 7 is a flowchart for creating a checkpoint in accordance with an illustrative embodiment. FIG. 7 details the steps performed in step 604 in FIG. 6. The steps in FIG. 7 are performed by a thread in a kernel, such as thread 312 in FIG. 3.

Creating the checkpoint begins with the thread receiving a request to create a checkpoint of a software partition (step 702). A process in the software partition is frozen (step 704). The state of the frozen process is copied and stored in the checkpoint data (step 706). For each queue containing an asynchronous input/output request submitted by the frozen process, the request is marked "suspended" in the queue(s) (step 708). The asynchronous input/output requests marked "suspended" are copied and stored in the checkpoint data (step 710).

A determination is made whether there is a process in the software partition that is not frozen (step 712). If the answer in step 712 is "yes", and there is a process in the software partition that is not frozen, then steps 704-712 are repeated until all processes in the software partition are frozen. If the answer in step 712 is "no" and all processes in the software partition are frozen, then the thread ends creating the checkpoint.

Those versed in the art will appreciate that the steps in FIG. 7 may be performed in a slightly different order, while still keeping within the illustrative embodiments. For example, all the processes in the software partition are frozen first. The state of each frozen process is copied to the checkpoint. Each request in the queue(s) containing an asynchronous input/output request submitted by the frozen processes is marked "suspended". The asynchronous input/output requests marked "suspended" are copied to the checkpoint. Additionally, the state of each frozen process may be copied to the checkpoint after, instead of before, copying the requests marked "suspended" to the checkpoint.

Thus, the illustrative embodiments described herein provide a computer implemented method, apparatus, and computer program product for creating a checkpoint for a software partition. A checkpoint request is received for creating the checkpoint for the software partition. Each process in a set of processes in the software partition is frozen to form a set of frozen processes. In an asynchronous input/output queue, the status of each input/output request sent by the set of frozen processes is set to "suspended" to form a set of suspended requests, wherein the set of suspended requests are not performed. The set of suspended requests are stored in the checkpoint to form stored requests.

The illustrative embodiments allow an accurate checkpoint to be created for a software partition, to allow the software partition to be quickly and easily moved from a departure server to an arrival server. For example, processes from a departure server may be moved to an arrival server to allow the departure server to be shut down for maintenance. In addition, the software load on multiple servers can be more evenly distributed by moving a software partition from a departure server with a heavy load to an arrival server with a lighter load. Also, a software partition can be copied from a departure server to an arrival server, allowing the processes in the software partition to run simultaneously on both servers, doubling the number of transactions the software partition processes.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read-only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a checkpoint containing the state of each process in a software partition prior to moving the software partition from a first server to a second server, the computer implemented method comprising:
    storing, in an asynchronous input/output queue, each input/output request sent by a set of processes to form queued input/output requests, wherein an input/output request is an asynchronous request for an input or output from an input/output device;
    setting an initial status of each queued input/output request to a queued state by storing, in a status field that is added to each queued input/output request, a queued status value when each queued input/output request is initially stored in the asynchronous queue;
    executing, by a first one of a plurality of threads, a first one of the queued input/output requests, wherein a queued status value that is stored in a status field that is added to the first one of the queued input/output requests is changed to an executing status value when the first one of the plurality of threads starts executing the first one of the queued input/output requests; and
    responsive to receiving a request to create the checkpoint for the software partition:
        suspending each process in the set of processes in the software partition to form a set of suspended processes, wherein a first set of the queued input/output requests were executing and had the executing status value and a second set of the queued input/output requests had a queued status value when the request to create the checkpoint was received;
        resetting the status of only the second set of the queued input/output requests to a suspended state by storing, in a status field of each one of the second set of the queued input/output requests, a suspended status value to form a set of suspended input/output requests, wherein only the suspended input/output requests are not executed by any of the plurality of threads;
        wherein the status of each one of the first set of the queued input/output requests having the executing status value is left unchanged, and wherein all queued input/output requests having the executing status value continue to be executed by one of the plurality of threads while each process in the set of processes is suspended; and
        storing the set of suspended input/output requests in the checkpoint only after all of the first set of the queued input/output requests have completed executing.

2. The computer implemented method of claim 1, further comprising:
    determining a state of each suspended process in the set of suspended processes; and
    storing the state of each suspended process in the checkpoint to create stored states.

3. The computer implemented method of claim 2, further comprising:
    copying the software partition from the first server to the second server;
    copying the stored states from the checkpoint to the second server to form copied states;
    copying the stored suspended input/output requests from the checkpoint to the second server to form copied suspended input/output requests, wherein the copied suspended input/output requests are placed in an asynchronous input/output queue on the second server;
    setting a status of each copied suspended input/output request in the asynchronous input/output queue on the second server to the queued status, by storing, in a status field added to each copied suspended input/output request, the queued status value, wherein each one of the input/output requests included in the asynchronous input/output queue on the second server having the queued status value are performed on the second server by a second thread in a second kernel in the second server; and
    starting each process in the set of suspended processes in the software partition on the second server using the copied states.

4. The computer implemented method of claim 3, further comprising:
  killing each process in the set of suspended processes on the first server, wherein killing each process terminates the execution of each process; and
  deleting the set of suspended input/output requests in the asynchronous input/output queue on the first server.

5. The computer implemented method of claim 3, further comprising:
  resetting a status of each suspended input/output request in the set of suspended input/output requests in the asynchronous input/output queue on the first server by storing the queued status value in a status field that is added to each copied suspended input/output request; and
  starting each process in the set of suspended processes in the software partition on the first server.

6. A data processing system for creating a checkpoint containing the state of each process in a software partition prior to moving the software partition from a first server to a second server, the data processing system comprising:
  a bus;
  a storage device connected to the bus, wherein the storage device contains computer usable program code;
  a communications unit connected to the bus; and
  a processing unit connected to the bus for executing the computer usable program code, wherein the processing unit executes the computer usable program code to:
  store, in an asynchronous input/output queue, each input/output request sent by a set of processes to form queued input/output requests, wherein an input/output request is an asynchronous request for an input or output from an input/output device;
  set an initial status of each queued input/output request to a queued state by storing, in a status field that is added to each queued input/output request, a queued status value when each queued input/output request is initially stored in the asynchronous queue;
  execute, by a first one of a plurality of threads, a first one of the queued input/output requests, wherein a queued status value that is stored in a status field that is added to the first one of the queued input/output requests is changed to an executing status value when the first one of the plurality of threads starts executing the first one of the queued input/output requests; and
  responsive to receiving a request to create the checkpoint for the software partition:
    suspend each process in the set of processes in the software partition to form a set of suspended processes, wherein a first set of the queued input/output requests were executing and had the executing status value and a second set of the queued input/output requests had a queued status value when the request to create the checkpoint was received;
    reset the status of only the second set of the queued input/output requests to a suspended state by storing, in a status field of each one of the second set of the queued input/output requests, a suspended status value to form a set of suspended input/output requests, wherein only the suspended input/output requests are not executed by any of the plurality of threads;
    wherein the status of each one of the first set of the queued input/output requests having the executing status value is left unchanged, and wherein all queued input/output requests having the executing status value continue to be executed by one of the plurality of threads while each process in the set of processes is suspended; and
    store the set of suspended input/output requests in the checkpoint only after all of the first set of the queued input/output requests have completed executing.

7. The method of claim 1, further comprising:
  storing the checkpoint in a storage device that is external to the first server and the second server.

8. The data processing system of claim 6, wherein the processing unit further executes the computer usable program code to:
  determine a state of each suspended process in the set of suspended processes;
  store the state of each suspended process in the checkpoint to create stored states;
  copy the software partition from the first server to the second server;
  copy the stored states from the checkpoint to the second server to form copied states;
  copy the stored suspended input/output requests from the checkpoint to the second server to form copied suspended input/output requests, wherein the copied suspended input/output requests are placed in an asynchronous input/output queue on the second server;
  set a status of each copied suspended input/output request in the asynchronous input/output queue on the second server to the queued status, by storing, in a status field added to each copied suspended input/output request, the queued status value, wherein each one of the input/output requests included in the asynchronous input/output queue on the second server having the queued status value are performed on the second server by a second thread in a second kernel in the second server; and
  start each process in the set of suspended processes in the software partition on the second server using the copied states.

9. The data processing system of claim 8, wherein the processing unit further executes the computer usable program code to:
  kill each process in the set of suspended processes on the first server, wherein killing each process terminates the execution of each process; and
  delete the set of suspended input/output requests in the asynchronous input/output queue on the first server.

10. The data processing system of claim 8, wherein the processing unit further executes the computer usable program code to:
  reset a status of each suspended input/output request in the set of suspended input/output requests in the asynchronous input/output queue on the first server by storing the queued status value in a status field that is added to each copied suspended input/output request; and
  start each process in the set of suspended processes in the software partition on the first server.

11. The data processing system of claim 6, wherein the processing unit further executes the computer usable program code to store the checkpoint in a storage device that is external to the first server and the second server.

12. A computer program product stored on a non-transitory computer readable storage medium for creating a checkpoint containing the state of each process in a software partition prior to moving the software partition from a first server to a second server, the computer program product comprising:
  computer usable program code for storing, in an asynchronous input/output queue, each input/output request sent by a set of processes to form queued input/output requests, wherein an input/output request is an asynchronous request for an input or output from an input/output device;

computer usable program code for setting an initial status of each queued input/output request to a queued state by storing, in a status field that is added to each queued input/output request, a queued status value when each queued input/output request is initially stored in the asynchronous queue;

computer usable program code for executing, by a first one of a plurality of threads, a first one of the queued input/output requests, wherein a queued status value that is stored in a status field that is added to the first one of the queued input/output requests is changed to an executing status value when the first one of the plurality of threads starts executing the first one of the queued input/output requests; and responsive to receiving a request to create the checkpoint for the software partition:

computer usable program code for suspending each process in the set of processes in the software partition to form a set of suspended processes, wherein a first set of the queued input/output requests were executing and had the executing status value and a second set of the queued input/output requests had a queued status value when the request to create the checkpoint was received;

computer usable program code for resetting the status of only the second set of the queued input/output requests to a suspended state by storing, in a status field of each one of the second set of the queued input/output requests, a suspended status value to form a set of suspended input/output requests, wherein only the suspended input/output requests are not executed by any of the plurality of threads;

wherein the status of each one of the first set of the queued input/output requests having the executing status value is left unchanged, and wherein all queued input/output requests having the executing status value continue to be executed by one of the plurality of threads while each process in the set of processes is suspended; and computer usable program code for storing the set of suspended input/output requests in the checkpoint only after all of the first set of the queued input/output requests have completed executing.

13. The computer program product of claim 12, further comprising computer usable program code for determining a state of each suspended process in the set of suspended processes;

computer usable program code for storing the state of each suspended process in the checkpoint to create stored states;

computer usable program code for copying the software partition from the first server to the second server;

computer usable program code for coping the stored states from the checkpoint to the second server to form copied states;

computer usable program code for coping the stored suspended input/output requests from the checkpoint to the second server to form copied suspended input/output requests, wherein the copied suspended input/output requests are placed in an asynchronous input/output queue on the second server;

computer usable program code for setting a status of each copied suspended input/output request in the asynchronous input/output queue on the second server to the queued status, by storing, in a status field added to each copied suspended input/output request, the queued status value, wherein each one of the input/output requests included in the asynchronous input/output queue on the second server having the queued status value are performed on the second server by a second thread in a second kernel in the second server; and computer usable program code for starting each process in the set of suspended processes in the software partition on the second server using the copied states.

14. The computer program product claim 13, further comprising:

computer usable program code for killing each process in the set of suspended processes on the first server, wherein killing each process terminates the execution of each process; and computer usable program code for deleting the set of suspended input/output requests in the asynchronous input/output queue on the first server.

15. The computer program product of claim 13, further comprising:

computer usable program code for resetting a status of each suspended input/output request in the set of suspended input/output requests in the asynchronous input/output queue on the first server by storing the queued status value in a status field that is added to each copied suspended input/output request; and computer usable program code for starting each process in the set of suspended processes in the software partition on the first server.

16. The computer program product of claim 12, wherein the computer usable program code for resetting the status of each input/output request having the queued status value to the suspended state further comprises:

computer usable program code for waiting for the completion of the first one of the plurality of threads.

17. The computer program product of claim 12, further comprising:

computer usable program code for storing the checkpoint in a storage device that is external to the first server and the second server.

* * * * *